Figure 2:
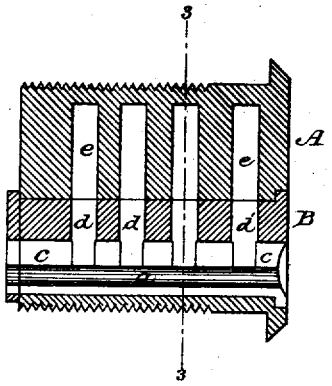

J. SCHADE,

Assignor of one-half to G. H. SHERMAN, and said SCHADE and SHERMAN assignors to THE YALE LOCK MANUFACTURING COMPANY.

HUB FOR LOCKS.

No. 9,787. Reissued July 5, 1881.

*Fig. 3,*

*Fig. 4,*

*WITNESSES*

Wm. A. Skinkle

Geo. W. Buck

*By his Attorneys*

*INVENTOR*

John Schade.

Marcus S. Hopkins

N. PETERS, Photo-Lithographer, Washington, D. C.

UNITED STATES PATENT OFFICE.

JOHN SCHADE, OF STAMFORD, CONNECTICUT, ASSIGNOR OF ONE-HALF TO GEORGE H. SHERMAN, AND SAID SCHADE AND SHERMAN ASSIGNORS TO THE YALE LOCK MANUFACTURING COMPANY, OF STAMFORD, CONN.

HUB FOR LOCKS.

SPECIFICATION forming part of Reissued Letters Patent No. 9,787, dated July 5, 1881.

Original No. 192,020, dated June 12, 1877. Application for reissue filed October 25, 1880.

*To all whom it may concern:*

Be it known that I, JOHN SCHADE, of Stamford, in the county of Fairfield and State of Connecticut, have invented a new and useful Improvement in Slotted Lock-Hubs or Roll-Backs, of which the following is a specification, reference being had to the accompanying drawings.

The object of my improvement is to afford protection against picking that class of locks in which longitudinally-slotted hubs or roll-backs and pin-tumblers, engaging with the roll-backs and set for unlocking by flat keys, notched or bitted upon one side of their blades, are used, and also to afford a guide and support for the keys, to keep them in proper position in engagement with the hubs when inserted therein.

My invention is designed to accommodate a longitudinally-grooved key-blade, and in carrying it out I form a swell or projection on one side, or it may be on both sides, of the ordinary hub-slot in a lock-hub, which is adapted to receive a flat sheet-metal key that will raise and set the pins or tumblers to the proper position, so that the hub may be turned for unlocking. This swell or projection partly closes the hub-slot and forms an obstacle to the insertion and successful working of picking-tools, and increases the difficulty of picking. It also forms a guide to direct the key to its proper bearings and performs a very useful service in keeping the key in proper position for performing the functions of locking and unlocking.

I am aware that to form a projection on one or both sides of a key-hole and a corresponding longitudinal groove or grooves in the side or sides of the key-blade is not new, and I do not claim that as my invention, broadly.

My invention is limited to merely combining a projection or projections with a longitudinal slot and with the pin-recesses of a rotating hub of the kind above mentioned, in which the key on being inserted into the hub-slot raises and sets the tumblers so that the hub will turn.

It is well known that in the effort to pick a lock of this class picking-tools are introduced through the ordinary open key-slot with facility, by means of which the pins or tumblers are raised to their proper height, and are held there until all are so adjusted by the tentative process that the hub is free to revolve.

By reference to the drawings it will be noted that the pin-recesses in my hub extend down to the projection in the key-slot, so that when the key is out the pins may fall quite to the projection. As the width of the key-blade extending above the projection when the key is inserted is not great, and as the key is so bitted as when inserted only to raise the pins slightly, in order to set them, as usual, in line with the periphery of the hub to permit its rotation, there is only a small space above the projection in which to manipulate a picking-tool to set the pins and thus pick the lock. Consequently the mere insertion of an ordinary picking-tool above the projection would lift the hub-pins so high that their upper ends would pass above the periphery of the hub and lock it so that it could not rotate. Thus the introduction of the projection in the hub-slot renders the use of picking-tools in this manner in this class of locks exceedingly difficult, if not impossible, and hence the special value of the projection in the hub-slot in such locks.

Figure 1:
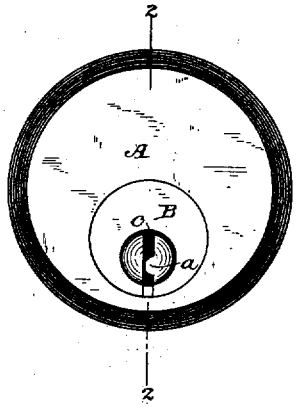
Figure 1:
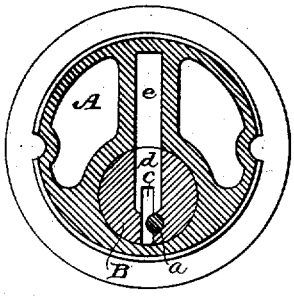
Figure 1:
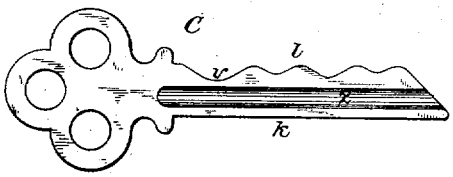

In the accompanying drawings, illustrating my invention, Figure 1 is a face view; Fig. 2, a longitudinal section; Fig. 3, a transverse section, and Fig. 4 a view of the key.

The letter A designates the lock-body, which is bored to form a bearing for the rotating hub or roll-back B. The latter is provided with a longitudinal key-slot, *c*, extending from its face to its rear end, and with transverse pin-recesses *d d'*.

*a* designates a longitudinal swell or projection extending along the wall of the slot and along the lower ends of the recesses *d d'*, nearly closing the slot beyond said recesses. This projection is best formed by inserting a wire or piece of metal and securing it to the side of the slot.

In the lock-body are formed ways *e*, for its pins or tumblers, which are arranged in the usual manner, so that when the hub or roll-back is in a certain position they communicate respectively with the recesses *d d'* of the plug.

C represents the key, having one of its edges straight, as shown at *k*, and the other edge, *l*, notched, the projections and indentations of the notches being inclined, so that their edges act as wedges in raising the pins or tumblers of the roll-back B, when the key is inserted endwise in its slot, as is usual in flat metal keys of this character. The key has a longitudinal groove or depression, *z*, along its side parallel to the straight edge and close to the deeper indentations, so that there is little space between them and the edge of the groove *z*, more particularly as indicated at *v*. This groove in the side of the key corresponds in form with the projection or swell *a* of the roll-back, with which it engages when the key is inserted into the roll-back to raise the pins or tumblers in their recesses to bring their outer ends flush with the surface of the roll-back, so that it can be revolved.

As is usual in a lock of this character, the tumblers or pins reciprocate in the plane of the key-slot at right angles to the hub-axis, and have no rotary movement, except when carried around by the hub, in which they are seated. Now, as the recess *d'*, for instance, terminates at the projection *a* of the hub-slot, and as the bottom of the corresponding indentation in the key, when the key is introduced, is near the hub-projection, it is evident that the pin or tumbler of the recess *d'* must, in order to admit of the turning of the hub, be but slightly elevated. The swell therefore forms an obstruction, between which and the end of the pin it is very difficult, if not impossible, to operate a picking-tool.

What I claim as my invention, and desire to secure by Letters Patent, is—

1. The combination, with the revolving plug B, having the key-slot *c*, pin or tumbler recesses *d d'*, and the longitudinal swell or projection *a* in the key-slot at the ends of the tumbler-recesses, of the key C, having the indentations, and the longitudinal groove *z*, substantially as specified.

2. In the rotating hub of a lock having a longitudinal key-slot, and transverse tumbler-recesses communicating therewith, the swell or projection extending along the slot at the ends of the tumbler-recesses and obstructing the slot beyond said ends, substantially as specified.

3. The combination of the revolving hub or roll-back and the wire inserted longitudinally in its slot to form a projection therein, substantially as set forth.

In testimony that I claim the foregoing I have hereunto set my hand this 21st day of September, 1880.

JOHN SCHADE.

Witnesses:
DAVID H. SCOFIELD,
CHARLES E. HOLLY.